United States Patent [19]

Iwatsuka

[11] Patent Number: 5,499,307
[45] Date of Patent: Mar. 12, 1996

[54] OPTICAL ISOLATOR AND POLARIZATION SPLITTER THEREFOR

[75] Inventor: Shinji Iwatsuka, Oamishirasato, Japan

[73] Assignee: TDK Corporation, Tokyo, Japan

[21] Appl. No.: 320,816

[22] Filed: Oct. 11, 1994

[30] Foreign Application Priority Data

Oct. 13, 1993 [JP] Japan .................................. 5-278925
Oct. 13, 1993 [JP] Japan .................................. 5-278926

[51] Int. Cl.$^6$ .................................................. G02B 6/27
[52] U.S. Cl. .......................... 385/11; 359/488; 359/494; 385/15
[58] Field of Search .................................. 385/11, 15, 16, 385/484, 485, 487, 488, 494, 495, 497, 499

[56] References Cited

U.S. PATENT DOCUMENTS

| | | | |
|---|---|---|---|
| 4,239,329 | 12/1980 | Matsumoto | 385/11 |
| 4,712,880 | 12/1987 | Shirasaki | 359/484 |
| 4,761,050 | 8/1988 | Byron | 385/16 |
| 4,974,944 | 12/1990 | Chang | 359/497 |
| 4,978,189 | 12/1990 | Blonder et al. | 350/96.12 |
| 4,988,170 | 1/1991 | Buhrer | 359/497 |
| 5,033,830 | 7/1991 | Jameson | 359/484 |
| 5,267,078 | 11/1993 | Shiraishi et al. | 359/484 X |

FOREIGN PATENT DOCUMENTS

| | | |
|---|---|---|
| 2-0018525 | 1/1990 | Japan . |
| 3-0022962 | 3/1991 | Japan . |
| 3-0196115 | 8/1991 | Japan . |
| 4-0337512 | 10/1992 | Japan . |
| 4-0349421 | 12/1992 | Japan . |

*Primary Examiner*—John D. Lee
*Attorney, Agent, or Firm*—Panitch Schwarze Jacobs & Nadel

[57] ABSTRACT

An optical isolator having no dependence on direction of plane of polarization is provided by using a pair of polarization splitters, each comprising at least two parallel optical waveguides, and a birefringent crystal plate inserted in a groove formed obliquely in said waveguides. A plane formed by said two optical waveguides is parallel to vector normal to the incident surface of said birefringent crystal plate, the optical axis of said birefringent crystal plate is also parallel to said plane, and the following relationship is substantially satisfied:

$$\tan \theta_{in} = A/[\sqrt{B}(n_{in}-\sqrt{B})]$$

where
$A = (n_O^2 - n_E^2) \cos \theta_C \sin \theta_C$
$B = n_E^2 \sin^2 \theta_C + n_O^2 \cos \theta_C$
$n_{in}$: Refractive index of the optical waveguides
$n_O$: Refractive index of the birefringent crystal plate for ordinary light
$n_E$: Refractive index of the birefringent plate for extraordinary light
$\theta_{in}$: Angle between axes of the optical waveguides and the vector normal to the incident surface of each of the birefringent crystal plates
$\theta_C$: Angle between axes of the optical waveguides and the optical axis of the birefringent crystal plate (side opposite to $\theta_{in}$ is deemed positive).

12 Claims, 5 Drawing Sheets

OPTICAL ISOLATOR AND POLARIZATION SPLITTER THEREFOR

BACKGROUND OF THE INVENTION

1. Field of the Invention

The present invention relates to an optical isolator and, more particularly, to an optical isolator which is not dependent on plane of polarization and utilizes polarization splitters made of birefringent crystal.

2. Prior Art

Optical isolators are usually constructed from a combination of a plurality of bulk optical parts such as polarizers, lenses, Faraday rotators, birefringent elements, half wave plates, etc. and accordingly, are accompanied by a number of problems including requirements of a number of parts, large overall size and troublesome and time-consuming adjustment between the parts. To cope with these problems, a proposal was made to minimize the size of the optical isolator by directly incorporating an optical isolator in an optical fiber system.

Japanese Patent B-3-22962 discloses an optical isolator having one integral optical fiber which is cut at one or more axial positions to form one or more grooves and a multilayer dielectric metal layer polarizer, Faraday rotator, etc. are inserted in the groove or grooves.

The present invention utilizes this type of technique but the one disclosed in this prior art is of a type which is dependent on plane of polarization.

U.S. Pat. No. 4,978,189 and Japanese Patent A-3-196115 disclose optical isolators which are not dependent on the plane of polarization. The optical isolators disclosed in these references comprise an optical waveguide having a polarization splitter inserted therein to split the incoming light into two polarized lights, which are then guided by a pair of optical waveguides to respective Faraday rotators and half wave plates. The light beams are then recombined by a recombinant polarization splitter. However, with this device, it is difficult to manufacture polarization splitters for the splitting and recombination.

Japanese Patent A-4-307512 and Japanese Patent A-4-349421 disclose optical isolators which do not depend on the plane of polarization and which comprise an optical fiber embedded in a substrate plate, one oblique slit formed in the substrate plate by obliquely cutting the plate and the optical fiber together, and an optical isolator element (consisting of three beam splitters and a Faraday rotator; or two beam splitters, a half wave plate and a Faraday rotator) inserted in the slit. The angle of the end surface of the optical fiber and the thickness of the elements are so selected that the angle of inclination of the light beam exiting from the fiber's oblique end is compensated for by the elements as if the light travels along a straight pass through the optical fiber and the return lights reflected by end surfaces of the elements are prevented from returning to the input side owing to the oblique cut. According to this technique, the isolator is easily assembled without any adjustment but the total thickness of the optical isolator is made thick due to the fact that all of the elements are integral and has a drawback of large diffraction loss.

Thus, the techniques disclosed in these Japanese Patent A-4-307512 and Japanese Patent A-4-349421 have the drawback of large optical loss.

On the other hand, proposed as splitters which maybe used in such an optical isolator is an optical switch disclosed in Japanese Patent A-2-18525, for example. The optical switch of this type comprises four terminal optical waveguides having two input terminals and two outputs terminals formed on a substrate plate, a polarized light splitter film inserted in a slit formed at a crossing point of two input-side waveguides, a polarized light splitter film (for recombining the polarized lights) inserted in a slit formed at a crossing point of two output-side waveguides, and a magneto-optical element (Faraday rotating element) and a half wave plate both inserted in a single slit formed between the two optical splitter films. Any one of the input terminals can be connected to any one of the output terminals by reversing a magnetic field applied to the magneto-optical element.

On the other hand, U.S. Pat. No. 4,978,189 discloses an optical switch by controlling the effective refractive index at the crossing points in place of using polarized light splitter films disclosed in Japanese A-2-18525.

However, these polarization splitters disclosed in these literatures require crossing points of the optical waveguides which are difficult to manufacture with a sufficient precision.

A principal object of the present invention is to provide an optical isolator which is low in loss and easy to assemble with no adjustment, and in which the two polarized lights have the same length of path and thus the polarization mode dispersion (phase difference introduced depending on the polarization) is low.

Another object of the present invention is to provide an optical isolator having a large return loss and to provide an polarization splitter therefor.

A further object of the present invention is to provide an optical polarization splitter which has no crossing point of optical waveguides.

SUMMARY OF THE INVENTION

In the following including the claims, it should be noted that the term "optical waveguide" or "optical waveguides" are intended to include optical fiber or fibers, too.

The present invention provides an optical isolator having no dependence on plane of polarization, which comprises:

a pair of parallel linear waveguides having first, second and third grooves formed in this order along the waveguides;

a first birefringent crystal plate inserted in the first groove;

a half wave plate and a Faraday rotator inserted in the second groove;

a second birefringent crystal plate inserted in the third groove;

and said first and second birefringent crystal plates, said half wave plate and said Faraday rotator are so arranged that an incident light in a forward direction into one of the waveguides exits from the other of the waveguides, and an incident light in a reverse direction into the other waveguide does not return to said one of the waveguides.

This construction, as a pair of birefringent crystal plates are separately inserted in two grooves or slits, can provide an optical isolator having a low optical loss, which can be assembled without any adjustment, and a least polarization mode dispersion (phase difference between the different polarizations due to the difference in the length of the light travelling path) because the lengths of the light paths between the different polarizations are identical.

In more preferred construction of the optical isolator according to the present invention, the first and second birefringent crystal plates, said half wave plate and said Faraday rotator are obliquely arranged with respect to said optical waveguides, in such manner that an extraordinary light in the incident light in the forward direction into said one of the optical waveguides passes straight through the first birefringent crystal plate and an ordinary light in the incident light in said one of the optical waveguides is deviated through the first birefringent crystal plate into the other waveguide, planes of polarization of said extraordinary and ordinary lights are rotated by 90 degrees when they pass through said half wave plate and said Faraday rotator, and an extraordinary light now converted from said ordinary light passes straight through the second birefringent crystal plate and an ordinary light now converted from said extraordinary light is deviated into the other optical waveguide. This satisfies the following relationship: an extraordinary light in an incident light in the reverse direction into the other optical waveguide passes straight through the second birefringent crystal plate and an ordinary light in the incident light in the reverse direction into the other optical waveguide is deviated through the second birefringent crystal plate into said one of the waveguides, polarized planes of said extraordinary and ordinary lights are not rotated when they pass through said half wave plate and said Faraday rotator, and said extraordinary light passes straight through the first birefringent crystal plate into the other waveguide and said ordinary light is deviated from said one of the optical waveguides. With this construction, an advantage of a large return loss is obtained because the light reflected from the surfaces of the birefringent crystal plates, half wave plate, and Faraday rotator are deviated from the optical fibers and can never return to the input side of the optical fibers.

The optical isolator according to the present invention may be modified by using one or more optical waveguides in the incident side of each of the birefringent crystal plates in the incident side (input side in the forward direction and output side in the reverse direction) and optical waveguides one more larger in number on the exit side of each of the birefringent crystal plates.

According to the polarization splitter used in the present invention which comprises optical waveguides and either one of the birefringent crystal plates, no cross points are necessary in contrast to the conventional isolators or polarization splitters and the polarization splitter can simply be constructed with parallel linear optical waveguides.

Further, according to the present invention, the optical isolator is an integral combination of waveguides, half wave plate, and Faraday rotator and accordingly no further adjustment is required in use. Also, the optical isolator is not dependent on the plane of polarization of the incident light. Further, the diffraction loss is low in the present invention because elements are separately inserted in the waveguides. In addition, as there is no difference in length of the light paths for both polarizations, the polarization mode dispersion is minimized.

EXPLANATION OF PREFERRED EMBODIMENTS

Non-restrictive preferred embodiments will now be explained in detail in the following.

EXAMPLE 1

Figure 1A:
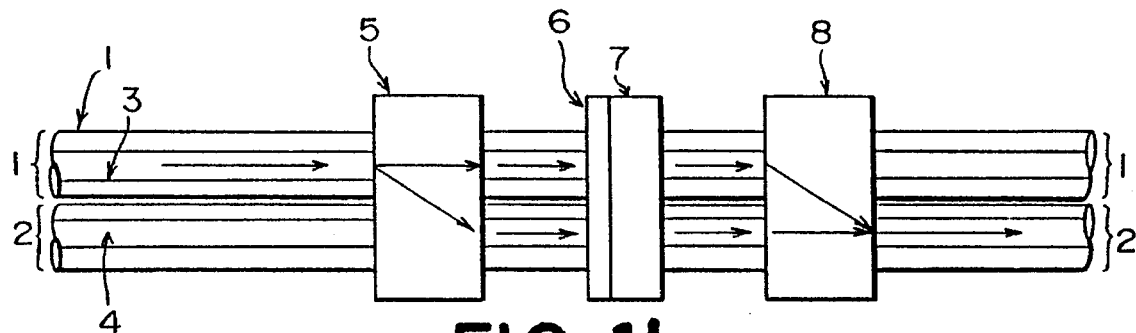
FIG. 1 is a schematic view explaining the principle of the optical isolator according to the present invention, wherein (a) shows the function for an incident light in the forward direction is and (b) shows the function for an incident light in the reverse direction.
Figure 1B:
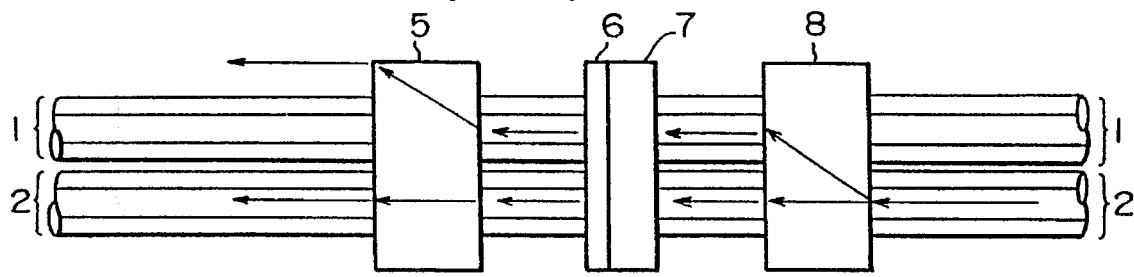

Referring to FIG. 1, a pair of optical fibers 1 and 2 having cores 3 and 4, respectively, are arranged in parallel with a closed spacing. The optical fibers 1 and 2 are cut at three locations along them to form grooves, in which inserted a first birefringent crystal plate 5, a half wave plate 6, a Faraday rotator 7 of a rotation angle of 45 degrees in contact with the plate 6, and a second birefringent crystal plate 8, in this order. The birefringent crystal plates 5 and 8 are so constructed as to permit an ordinary light of an incident light to pass straight through the birefringent crystal plates but to deviate an extraordinary light of the incident light toward the other of the optical fiber.

Explaining now the operation of the optical isolator of this embodiment, (a) of FIG. 1 explains the function of this embodiment for an incident light in the forward direction as indicated by arrows. The incident light in the forward direction from the optical fiber 1 is divided by the first birefringent crystal plate 5 into two lights, namely, ordinary and extraordinary lights. Then, the ordinary light travels straight in the first optical fiber 1 and then passes through the half wave plate 6 and the Faraday rotator 7 where the ordinary light is rotated by 90 degrees (45 degrees by half wave plate 6 and 45 degrees by the Faraday rotator 7) to become an extraordinary light which, in turn, is deviated from the axis of the first optical fiber 1 by the second birefringent crystal plate 8 and exits into the second optical fiber 2. On the other hand, the extraordinary light is deviated by the first birefringent crystal plate to exit to the second optical fiber 2 and travels along the second optical fiber 2 and passes through the half wave plate 6 and the Faraday rotator 7 where the light is rotated by 90 degrees to become a ordinary light. The now ordinary light passes straight through the second birefringent crystal plate 8 and exits to the second optical fiber. Thus, according to the present invention, an optical isolator which does not depend on the direction of the plane of polarization of the input light is attained. Moreover, as the difference in the length of the optical path is zero And accordingly, there is no polarization mode dispersion of the phase between the ordinary and extraordinary lights.

As shown in (b) of FIG. 1, for an incident light in the reverse direction which is usually return light due to reflection, the return light from the optical fiber 2 is split into two lights, namely, ordinary and extraordinary lights by the second birefringent crystal plate 8. The ordinary light travels straight in the optical fiber 2 and then passes through the Faraday rotator 7 and half wave plate 6 but remains as ordinary light (45 degrees by the Faraday rotator 7 and −45 degrees by the half wave plate 6 when looking in the forward direction), which, in turn, travels in the optical fiber 2 and passes straight through the first birefringent crystal plate 5 to exit into the optical fiber 2. On the other hand, the extraordinary light exiting from the birefringent crystal plate 8 travels along the optical fiber 1 and passes through the Faraday rotator 7 and half wave plate 6 but remains as extraordinary light which, in turn, is deviated from the axis of the optical fiber 1 and thus cannot exit to the first optical fiber 1.

Next, the reason why the optical isolator is low in loss will be explained. The diffraction loss L(dB) caused when a groove is formed in an optical waveguide or optical fiber is approximately expressed by the formula when the width d of the groove is not wide:

$$L=0.11 \ \lambda^2 d^2 / w^4$$

where $\lambda$ is wavelength of the light, w is effective spot size (radius) of the optical waveguide or optical fiber, d is effective width of the groove expressed by the width of the groove divided by the refractive index of the material inserted in the groove.

In the conventional techniques disclosed in Japanese Patent A-4-307512 and Japanese Patent A-4-349421, the first birefringent crystal plate, half wave plate, Faraday rotator, and second birefringent cryatal plate are integrally formed and accordingly the value d is large, leading to an increase in the loss.

In contrast, the present invention uses two optical waveguides, and the first birefringent crystal plate, half wave plate+Faraday rotator, and second birefringent crystal plate are inserted in separate grooves, and thus the loss is reduced.

For example, assuming that the first birefringent crystal plate and the second birefringent crystal plate is made of rutile having a thickness of 850 μm, the Faraday rotator is made of a Bi-substituted garnet having a thickness of 350 μm, the half wave plate is made of quartz having a thickness of 92 μm, and w=20 μm, $\lambda$=1.55 μm, the loss L=1.4 dB for the conventional devices, whereas in the present invention the loss is reduced to L=0.5 dB.

EXAMPLE 2

In this embodiment, the optical isolator is so constructed that an extraordinary light travels straight while an ordinary light is axially deviated. In this case, birefringent crystal plates must be so slanted that the incident surfaces of the plates satisfy required conditions.

Figure 2:
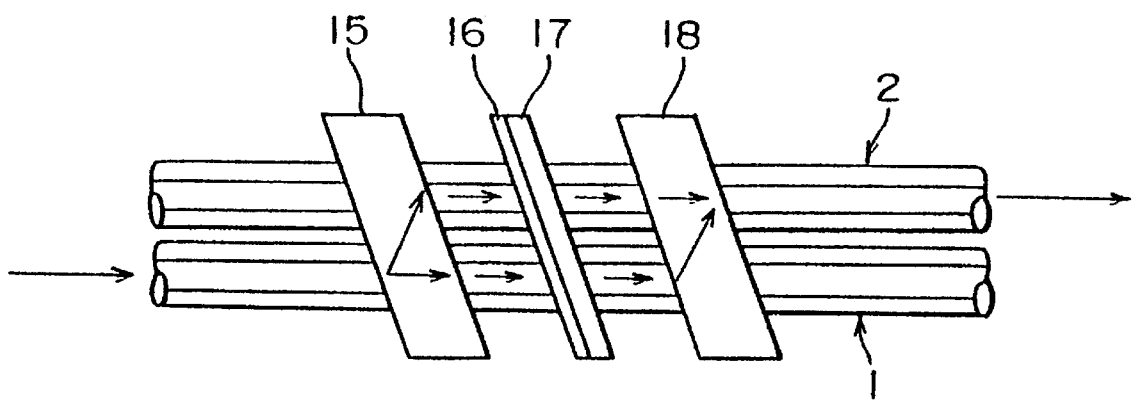
FIG. 2 is a view illustrating the optical isolator according to the second embodiment of the present invention.

More specifically, FIG. 2 illustrates the second embodiment of the optical isolator according to the present invention. This embodiment is different from that of Example 1 in that three grooves are formed in parallel optical fibers 1 and 2 and are extended obliquely with respect to the axes of the optical fibors 1 and 2, a first birefringent crystal plate 15 is inserted in the first groove, a half wave plate 16 and a Faraday rotator 17 having a rotation angle of 45 degrees and being in close contact with the plate 16 is inserted in the second groove and a second birefringent crystal plate 18 is inserted in the third groove. The birefringent crystal plates 15 and 18 are so inclined with respect to the optical fibers to satisfy the condition that an extraordinary light passes straight through them and an ordinary light is deviated in such a degree to enter the other optical fiber. Further, as the birefringent crystal plates are inclined, the lights reflected from the surfaces of the birefringent crystal plates can not return to the optical fibers on the input side, thereby increasing the return loss.

As an example, if the optical fiber has a refractive index of 1.45, rutile plate is used as the birefringent crystal plates and the optical axis (C-axis) of the rutile plates is positioned at an angle of 45 degrees with respect to the incident and exiting surfaces, and the rutile plates have a refractive index of 2.44 for ordinary light and 2.69 for extraordinary light, an extraordinary light will pass straight through the birefringent crystal plates at an incident angle of 12.3 degrees as shown in FIG. 2.

EXAMPLE 3

Figure 3:
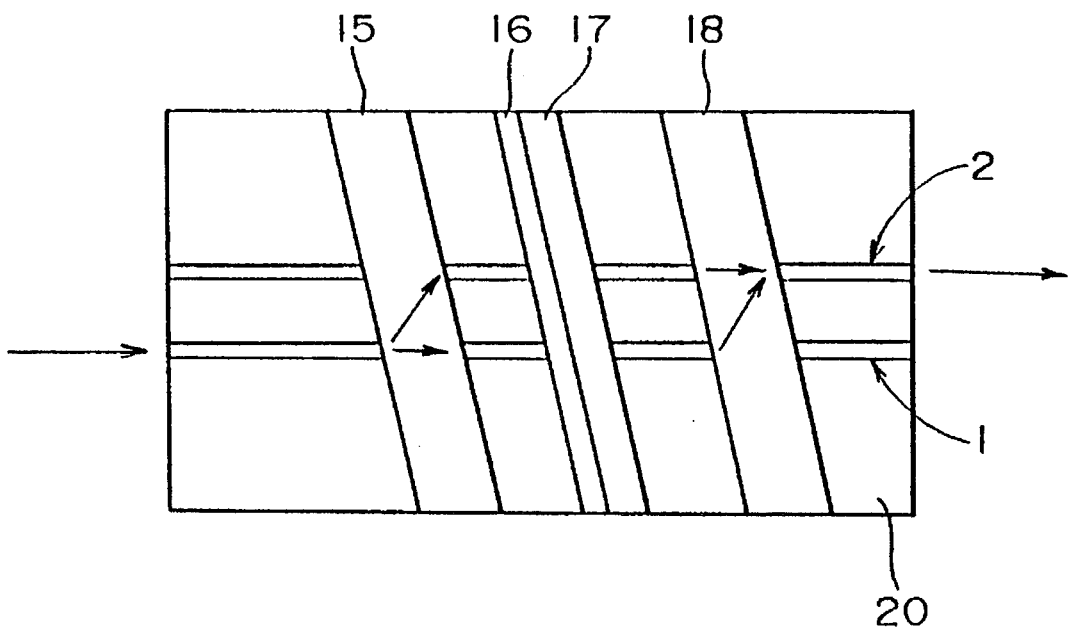
FIG. 3 is a view illustrating the optical isolator according to the third embodiment of the present invention.

FIG. 3 illustrates a third embodiment which is similar to the embodiment of FIG. 2, except that the optical isolator are prepared by depositing parallel optical waveguides 1 and 2 on a substrate using a thin film technique, then cutting obliquely the waveguides 1 and 2 at three locations to form three grooves, and inserting in these grooves a first birefringent crystal plate 15 satisfying the condition described in Example 2, a half wave plate 16, a Faraday rotator 17 having a rotation angle of 45 degrees, and a second birefringent crystal plate 18, in this order.

The operation of this embodiment is similar to that of Example 2.

In the operation of the optical isolators of the embodiments in Examples 2 and 3, an extraordinary light in an incident light travelling in the forward direction from the optical fiber 1 or optical waveguide 1 passes straight through the first birefringent crystal plate 15 and then through the half wave plate 16 and the Faraday rotator 17 where the extraordinary light is rotated by 90 degrees to become an ordinary light, and finally axially deviated by the second birefringent crystal plate 18 and exits to the optical fiber 2 or waveguide 2. On the other hand, an ordinary light in the incident light from the optical fiber 1 or optical waveguide 1 travelling in the forward direction is axially deviated by the first birefringent crystal plate 15 and guided to the optical fiber 2 or optical waveguide 2 and then passes through the half wave plate 16 and the Faraday rotator 17 to become an extraordinary light, which, in turn, passes straight through the second birefringence planar plate 18 and exit to the optical fiber 2 or the optical waveguide 2.

Each surface of the birefringent crystal plates are slanted with respect to the optical waveguides or optical fibers and accordingly any reflected lights from these surfaces cannot return to the optical fiber 1 or the optical waveguide 1 on the input side.

With respect to an incident light in the reverse direction, namely, a return light in the optical fiber 2 is split by the second birefringent crystal plate 18 into two lights, an extraordinary light and an ordinary light. The extraordinary light travels straight in the optical fiber 2, and passes through the Faraday rotator 17 and half wave plate 16 and remains as extraordinary light, and then passed through the first birefringent crystal plate 15 into the optical fiber 2 or optical waveguide 2. On the other hand, the ordinary light axially deviated by the second birefringent crystal plate 18 travels in the optical fiber 1 or optical waveguide 1 and passes through the half wave plate 16 and the Faraday rotator 17 but remains as ordinary light. Accordingly, the ordinary light is then deviated from the first optical fiber 1 or optical waveguide 1 by the first birefringent crystal plate 15.

As described in the foregoing, the polarization splitter may be constructed as shown in FIG. 1 but, more preferably, as shown in FIG. 2 the polarization splitter comprises at least two parallel linear optical waveguides (or optical fibers) are used and birefringent crystal plates are obliquely inserted in the grooves formed in the waveguides, so that the birefringent crystal plates allow extraordinary light to pass straight and deflects ordinary light out of axis. The number of the optical waveguides in the incident side may be less by one than the exit side.

The fundamental principle of the polarization splitter will now be explained in reference to FIG. 4 in which a birefringent crystal plate 1 is arranged in such an orientation that its optical axis (C-axis) lies in the plane of the sheet. As shown in (a) of FIG. 4, if the birefringent crystal plate 1 is disposed in such an orientation that the light is normally incident on the surface of the birefringent planar plate, an ordinary light O propagates in a straight line through the birefringent crystal plate, whereas an extraordinary light E is deviated from the original axis. Accordingly, if the incident light is a mixture of an ordinary light and an extraordinary light, polarized lights O and E are separated. However, this disposition has a problem of the light reflected by the surface of the birefringent crystal plate becoming a return light. If the birefringent crystal plate is disposed obliquely with respect to the incident lights, there is a specific angle of incidence $\theta_{in}$ at which the extraordinary light E passes straight through the birefringent crystal plate and the ordinary light O, on the other hand, is deviated from the incident axis according to the law of refraction. Accordingly, if a combination of an ordinary light O and an extraordinary light E is incident, it is split into a linearly travelling extraordinary light and an out-of-axis ordinary light and the reflected light is not reflected back to the incoming direction. The present invention utilizes this principle.

Figure 4A:
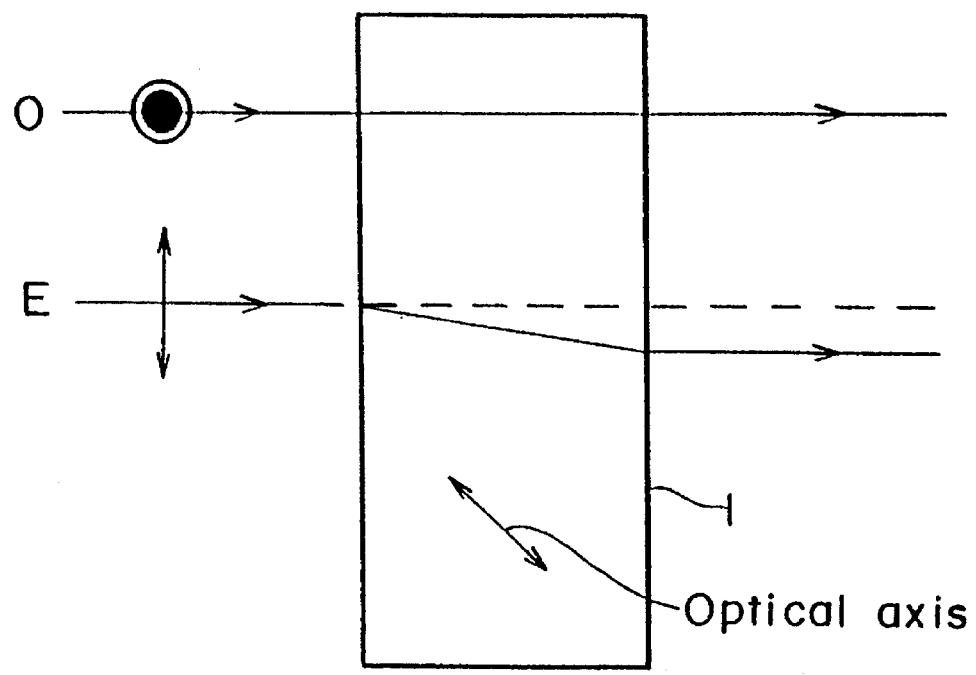
FIG. 4 is a schematic view explaining the principle of the polarization splitter according to the present invention wherein (a) illustrates a polarization splitter used in the first embodiment and (b) illustrates a polarization splitter used in the second and the third embodiments.
Figure 4B:
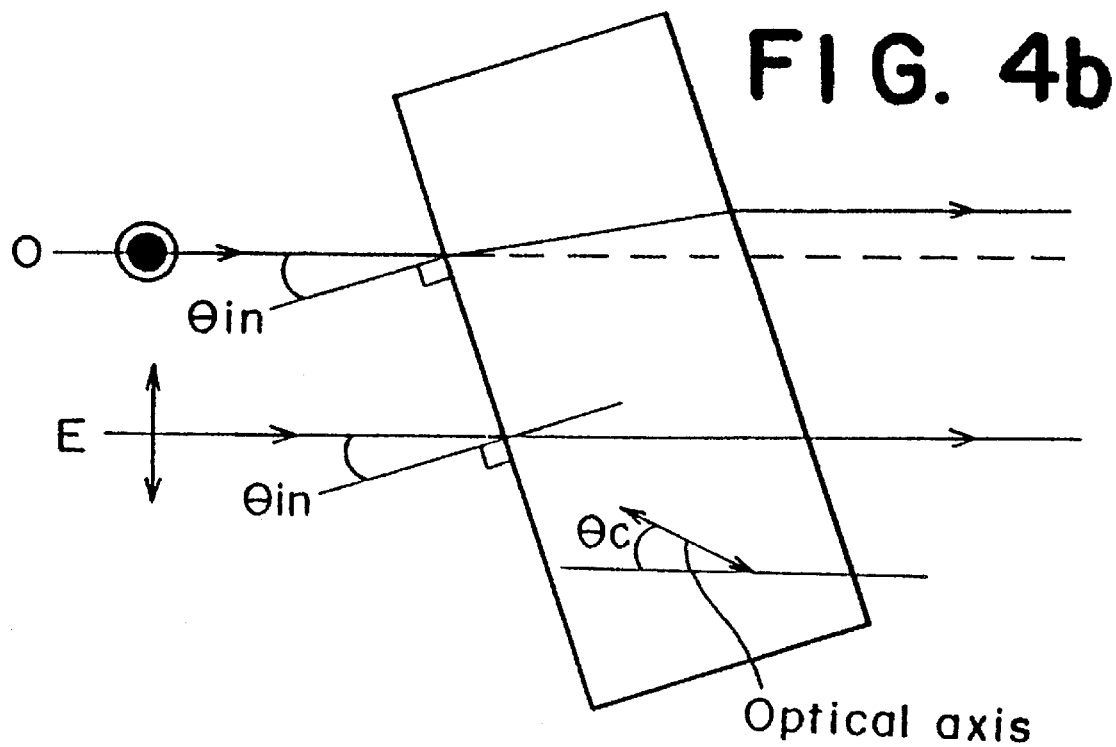

That is, a birefringent crystal plate is obliquely inserted in two parallel optical waveguides as shown in FIG. 2 or 3 and select the oblique angle of the plate is so selected to satisfy the relationship shown in (b) of FIG. 4. and the spacing between the two optical waveguides is set to correspond to the amount of deviation from the incoming axis. With this arrangement, an extraordinary light passes straight through the birefringent crystal plate and an ordinary light is deflected to the other optical waveguide, whereby this arrangement serves as a polarization splitter and lights reflected from the input surface as well as the output surface of this birefringent crystal plate do not return to the original optical waveguide.

Assuming in (b) of FIG. 4 that the angle between the normal vector of the input surface of the birefringent crystal plate and the incident light is $\theta_{in}$, the angle between the optical axis of the birefringent crystal plate is $\theta_C$ (deemed positive when the angle is in the direction opposite to the normal vector as shown in (b) of FIG. 4), the refractive index of the input zone is $n_{in}$, the refractive index for ordinary light O of the birefringent crystal planar plate is $n_O$, and the refractive index for the extraordinary light E of the birefringent crystal plate is $n_E$, the extraordinary light travels in a straight line as shown in (b) of FIG. 4 if the following condition is met.

$$\tan \theta_{in} = A/[\sqrt{B}(n_{in} - \sqrt{B})]$$

where $$A = (n_O^2 - n_E^2) \cos \theta_C \sin \theta_C$$

$$B = n_E^2 \sin^2 \theta_C + n_O^2 \cos \theta_C$$

As one example, if the refractive index of the optical waveguide is 1.45, the birefringent crystal plate is composed of a rutile having refractive index of $n_O=2.44$ for ordinary light and of $n_E=2.69$ for extraordinary light, and $\theta_C=32.7°$ as angle of the optical axis, the extraordinary light travels straight when the angle of incidence $\theta_{in}$ is 12.3°. At this time, the optical axis of the rutile is slanted at an angle of $\theta_{in}+\theta_C=45°$ with respect to the normal vector of the surface of the rutile plate. On the other hand, the ordinary light has an angle $\theta_{in}-\theta_O$ according to the law of refraction with respect the incident light where $$\theta_O = \sin^{-1}[(n_{in}/n_O) \sin \theta_{in}]$$

is satisfied. For the birefringent crystal plate of a thickness of t, the deviation of the axis of the exit light from the incident light is expressed by $$\sin (\theta_{in} - \theta_O) t / \cos \theta_o$$

and accordingly, if the optical waveguides are arranged with this spacing the incident light is guided to the optical waveguide on the exit side. In the above example, the ordinary light is deviated by an angle of 5° with respect the incident light and the deviation per one mm of the rutile plate is 88 μm. If the two optical waveguides are spaced at 88 μm and a rutile plate having an optical axis at $\theta_C=32.7°$ and a thickness of 1 mm is inserted in a groove slanted at an angle of $\theta_{in}=12.3°$, the extraordinary light goes straight and the ordinary light is deviated to an adjacent optical waveguide.

Figure 5:
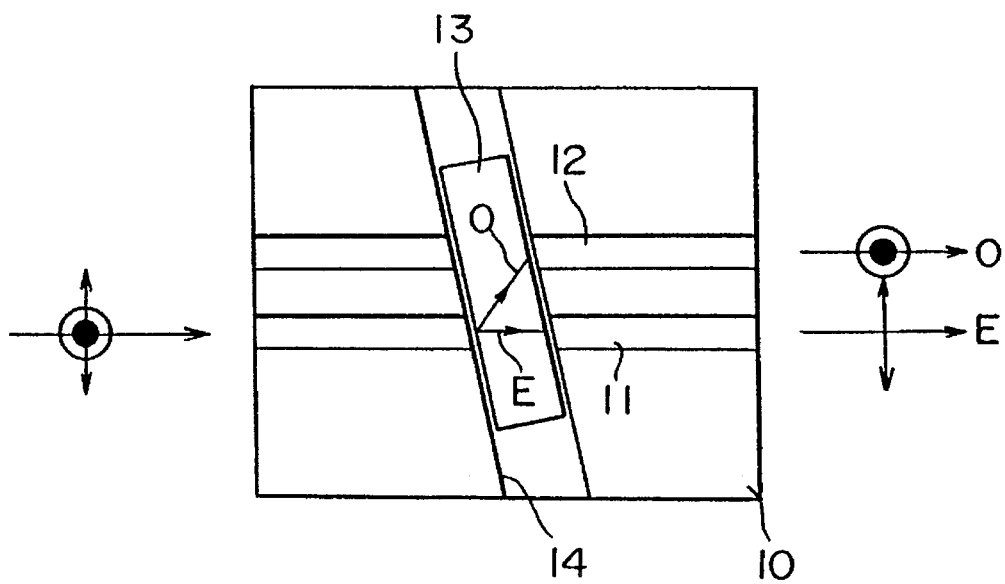
FIG. 5 is a view illustrating the first embodiment of the polarization splitter according to the present invention.

FIG. 5 is a first embodiment of the polarization splitter used already in FIG. 3. 10 is a substrate plate on which a first and second straight optical waveguides 11 and 12 are formed by means of a thin film deposition technique. The substrate plate 10 has a slit 14 cutting obliquely through the optical optical waveguides 11 and 12. A birefringent crystal plate 13, which satisfies the angle required for the extraordinary light travelling along a straight line and has the thickness that the ordinary light is deviated from the incident direction to the other optical waveguide 12.

In operation, the extraordinary light E in the light inputted into the optical waveguide 11 is guided straight through the birefringent crystal plate 13 into the optical waveguide 11 and the ordinary light O in the input light is deviated from the original direction by the birefringent crystal plate 11 into the optical waveguide 12.

Each surface of the birefringent crystal plates are oblique with respect to the optical waveguides and the reflected light from each surface cannot return to the optical waveguide on the input side.

If the polarization splitter is used for an optical isolator, the optical waveguide 12 on the input side is not required but may be used for other applications.

Figure 6:
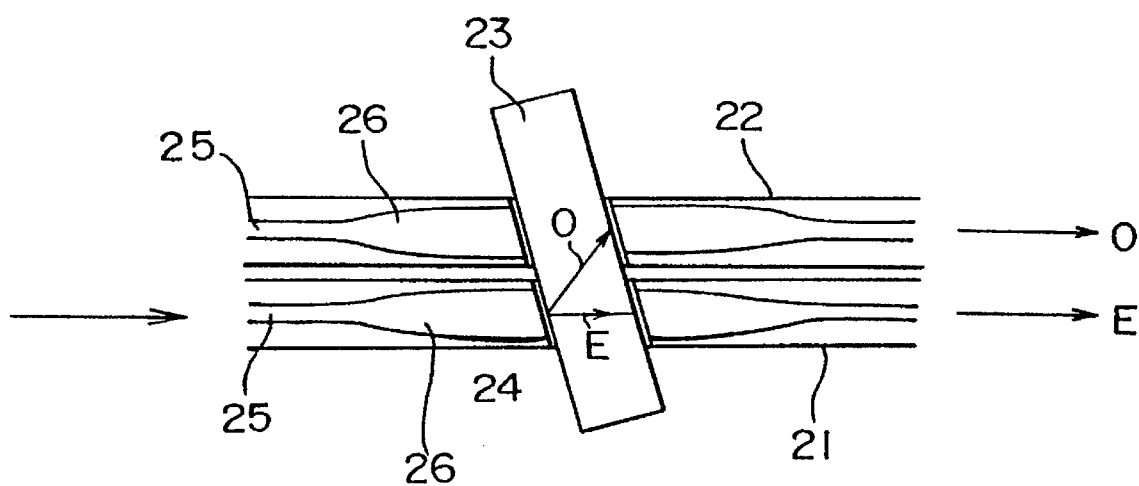
FIG. 6 is a view illustrating the second embodiment of the polarization splitter according to the present invention.

FIG. 6 illustrates a second embodiment of the polarization splitter according to the present invention. In this embodiment, a first optical fiber 21 and second optical fiber 22 embedded in a substrate plate. The optical waveguide 21 and 22 have a slit 24 cut through them in which a birefringent crystal plate 23 is inserted at an angle and of a thickness which satisfy a condition that an extraordinary light E travels straight therethrough and an ordinary light is deviated toward the other optical fiber 22. The cores 25 of the optical fibers 21 and 22 have enlarged core portions 26 on both sides of the birefringent crystal plate 23 so as to reduce the loss of light.

The operation of the polarization splitter according to the present embodiment has an operation similar to the first embodiment.

Figure 7:
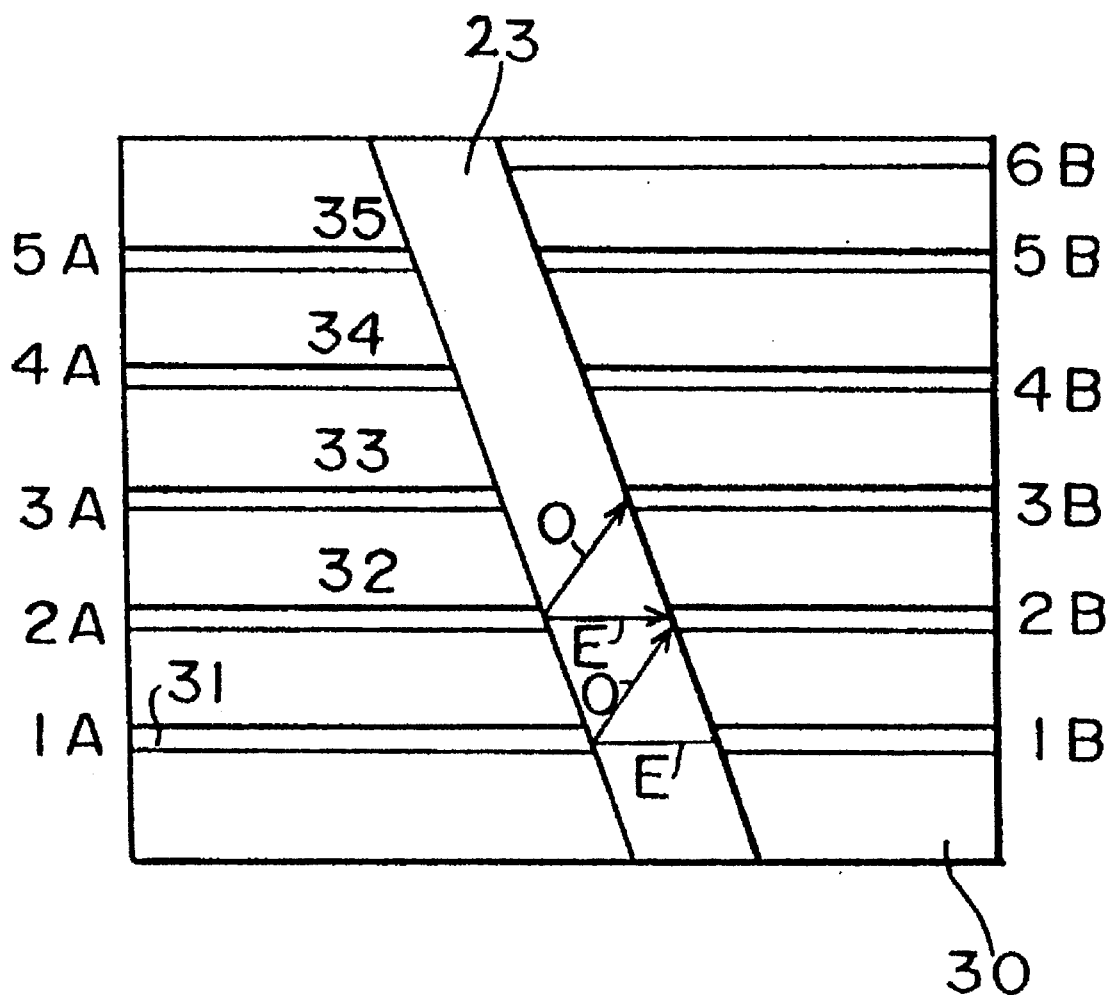
FIG. 7 is a view illustrating the third embodiment of the polarization splitter according to the present invention.

FIG. 7 shows a third embodiment of the present invention. This embodiment employs three or more optical waveguides having parallel linear first, second, . . . fifth waveguides 31, 32 . . . 35 embedded in a substrate plate 30. The substrate plate 30 has a slit 34 extending obliquely through them and a birefringent crystal plate 23 is inserted in the slit and fixed therein at an angle and of a thickness which satisfy a condition that an extraordinary light E in each optical waveguide 31, 32 . . . 35 travels straight therethrough and an ordinary light O in each of the optical waveguides 31, 32 . . . 35 is deviated toward the next adjacent one of the optical waveguides 32, . . . 35. The wave guides may be replaced with optical fibers.

In operation, an extraordinary light inputted into any particular one of the waveguides advances straight through the birefringent crystal plate 23 whereas an ordinary light in the particular waveguide is guided into a next adjacent optical waveguide. More specifically, extraordinary lights in the lights inputted into the input terminals 1A, 2A, . . . ,5A are respectively guided straight to the corresponding output terminals 1B, . . . , 6B, while ordinary lights in the input lights into the input terminals 1A, . . . , 5A are guided to the next adjacent output terminals 2B, . . . ,5B. On the other hand, the light reflected by the surfaces of the birefringent crystal plate 23 cannot return to the input side waveguides.

The polarization splitter will find applications in optical circulators and optical switches.

Although the present invention has been explained in connection with a few embodiments, it should be understand that there can be various modifications within the scope of the present invention.

What is claimed is:

1. An optical isolator having no dependence on direction of plane of polarization, which comprises:

a pair of parallel linear optical waveguides having first, second and third grooves formed in order along the waveguides;

a first birefringent crystal plate inserted in the first groove;

a half wave plate and a Faraday rotator inserted in the second groove;

a second birefringent crystal plate inserted in the third groove; and said first and second birefringent crystal plates, said half wave plate and said Faraday rotator being arranged so that an incident light in a forward direction into one of the waveguides exits from the other of the optical waveguides, and an incident light in a reverse direction into the other optical waveguide does not return to said one of the waveguides.

2. An optical isolator according to claim 1, wherein said first and second birefringent crystal plates, said half wave plate and said Faraday rotator are obliquely arranged with respect to said optical waveguides, so that an extraordinary light in the incident light in the forward direction entering said one of the optical waveguides passes straight through the first birefringent crystal plate and an ordinary light in the incident light in said one of the optical waveguides is deviated through the first birefringent crystal plate into the other optical waveguide, planes of polarization of said extraordinary and ordinary lights being rotated by 90 degrees when they pass through said half wave plate and said Faraday rotator, and an extraordinary light now converted from said ordinary light passing straight through the second birefringent plate and an ordinary light now converted from said extraordinary light being deviated into the other optical waveguide, and whereby an extraordinary light in an incident light in the reverse direction entering the other optical waveguide passes straight back through the second birefringent crystal plate and an ordinary light in the incident light in the reverse direction into the other optical waveguide is deviated through the second birefringent crystal plate into said one of the optical waveguides, polarized lanes of said extraordinary and ordinary lights not being rotated when they pass through said half wave plate and said Faraday rotator, said extraordinary light passing straight through the first birefringent crystal plate into the other optical waveguide and said ordinary light being deviated from said one of the optical waveguides.

3. An optical isolator according to claim 2, wherein a plane formed by said two optical waveguides is parallel to a vector normal to the incident surface of each of said birefringent crystal plates and the optical axes of said birefringent crystal plates are also parallel to said plane, and the following relationship is substantially satisfied:

$$\tan \theta_{in} = A/[\sqrt{B}(n_{in} - \sqrt{B})]$$

where $A = (n_O^2 - n_E^2) \cos \theta_C \sin \theta_C$ $B = n_E^2 \sin^2 \theta_C + n_O^2 \cos \theta_C$ $n_{in}$: Refractive index of the optical waveguides $n_O$: Refractive index of the birefringent crystal plates for ordinary light $n_E$: Refractive index of the birefringent crystal plates for extraordinary light $\theta_{in}$: Angle between axes of the optical waveguides and the vector normal to the incident surface of each of the birefringent crystal plates $\theta_C$: Angle between axes of the optical waveguides and the optical axis of each of the birefringent crystal plates (side opposite to $\theta_{in}$ is deemed positive).

4. An optical isolator according to claim 3, wherein the spacing d between the two parallel waveguides substantially satisfies the following relationship:

$$d = \sin (\theta_{in} - \theta_O) t / \cos \theta_O$$

where $\theta_O = \sin^{-1}[(n_{in}/n_O) \sin \theta_{in}]$ t=Thickness of the birefringent crystal plates.

5. An optical isolator according to claim 1, wherein the optical waveguides are composed of optical fibers.

6. An optical isolator having no dependence on a plane of polarization, which comprises in the following sequence beginning from an input side to an output side:

one or more parallel linear input optical waveguides;

a first birefringent crystal plate arranged obliquely with respect to the linear optical waveguides;

parallel intermediate optical waveguides one more greater in number than the at least one input optical waveguide and in alignment with said at least one input optical waveguide;

a half wave plate and a Faraday rotator inserted in an oblique groove formed in said intermediate optical waveguides;

a second birefringent crystal plate arranged obliquely with respect to the intermediate optical waveguides; and one or more parallel output waveguides in alignment with said intermediate optical waveguides;

wherein a plane formed by said optical waveguides is parallel to a vector normal to the incident surface of each of said birefringent crystal plates, the optical axes of said birefringent crystal plates are also parallel to said plane, and the following relationship is substantially satisfied:

$$\tan \theta_{in} = A/[\sqrt{B}(n_{in} - \sqrt{B})]$$

where $A = (n_O^2 - n_E^2) \cos \theta_c \sin \theta_c$
$B = n_E^2 \sin^2\theta_c + n_O^2 \cos \theta_c$
$n_{in}$: Refractive index of the optical waveguides
$n_O$: Refractive index of the birefringent crystal plates for ordinary light
$n_E$: Refractive index of the birefringent crystal plates for extraordinary light
$\theta_{in}$: Angle between axes of the optical waveguides and the vector normal to the incident surface of each of the birefringent crystal plates
$\theta_c$: Angle between axes of the optical waveguides and the optical axis of each of the birefringent crystal plates (side opposite to $\theta_{in}$ is deemed positive).

7. An optical isolator according to claim 6 wherein the spacing d between each adjacent pair of said parallel optical waveguides substantially satisfies the following relationship:

$$d = \sin(\theta_{in} - \theta_O) t / \cos \theta_O$$

where $\theta_O = \sin^{-1}[(n_{in}/n_O) \sin \theta_{in}]$
t=Thickness of the birefringent crystal plates.

8. A polarization splitter comprising at least two parallel optical waveguides, and a birefringent crystal plate inserted in a groove formed obliquely in said optical waveguides, wherein a plane formed by said two optical waveguides is parallel to a vector normal to the incident surface of said birefringent crystal plate, the optical axis of said birefringent crystal plate is also parallel to said plane, and the following relationship is substantially satisfied:

$$\tan \theta_{in} = A/[\sqrt{B}(n_{in} - \sqrt{B})]$$

where $A = (n_O^2 - n_E^2) \cos \theta_C \sin \theta_C$
$B = n_E^2 \sin^2\theta_C + n_O^2 \cos \theta_C$
$n_{in}$: Refractive index of the optical waveguides
$n_O$: Refractive index of the birefringent crystal plate for ordinary light
$n_E$: Refractive index of the birefringent plate for extraordinary light
$\theta_{in}$: Angle between axes of the optical waveguides and the vector normal to the incident surface of each of the birefringent crystal plates
$\theta_c$: Angle between axes of the optical waveguides and the optical axis of the birefringent crystal plate (side opposite to $\theta_{in}$ is deemed positive).

9. A polarization splitter according to claim 8, wherein the spacing d between adjacent two of the parallel optical waveguides substantially satisfies the following relationship:

$$d = \sin(\theta_{in} - \theta_O) t / \cos \theta_O$$

where $\theta_O = \sin^{-1}[(n_{in}/n_O) \sin \theta_{in}]$
t=Thickness of the birefringent crystal plate.

10. A polarization splitter according to claim 8 wherein the optical waveguides are composed of optical fibers.

11. A polarization splitter comprising one or more input optical waveguides on an incident side and parallel output optical waveguides on an exit side larger in number than said input optical waveguides and in alignment with said input optical waveguides, and a birefringent crystal plate inserted obliquely between said input and output optical waveguides, wherein a plane formed by said optical waveguides is parallel to a vector normal to the incident surface of said birefringent crystal plate, the optical axis of said birefringent crystal plate is also parallel to said plane, and the following relationship is substantially satisfied:

$$\tan \theta_{in} = A/[\sqrt{B}(n_{in} - \sqrt{B})]$$

where $A = (n_O^2 - n_E^2) \cos \theta_C \sin \theta_C$
$B = n_E^2 \sin^2\theta_C + n_O^2 \cos \theta_C$
$n_{in}$: Refractive index of the optical waveguides
$n_O$: Refractive index of the birefringent crystal plate for ordinary light
$n_E$: Refractive index of the birefringent crystal plate for extraordinary light
$\theta_{in}$: Angle between axes of the optical waveguides and the vector normal to the incident surface of the birefringent crystal plates
$\theta_C$: Angle between axes of the optical waveguides and the optical axis of the birefringent crystal plate (side opposite to $\theta_{in}$ is deemed positive).

12. A polarization splitter according to claim 11 wherein the spacing d between adjacent pair of the parallel optical waveguides substantially satisfies the following relationship:

$$d = \sin(\theta_{in} - \theta_O) t / \cos \theta_O$$

where $\theta_O \sin^{-1}[n_{in}/n_O) \sin \theta_{in}]$
t=Thickness of the birefringent crystal plate.

* * * * *